(12) United States Patent
Rancour et al.

(10) Patent No.: US 7,002,780 B2
(45) Date of Patent: Feb. 21, 2006

(54) SUSPENSION DESIGN FOR ELEVATED SLIDER ATTACHMENT

(75) Inventors: Michael L. Rancour, Minnetonka, MN (US); Richard L. Segar, Eagan, MN (US); Sandeepan Bhattacharya, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 288 days.

(21) Appl. No.: 09/968,266

(22) Filed: Oct. 1, 2001

(65) Prior Publication Data

US 2002/0051323 A1   May 2, 2002

Related U.S. Application Data

(60) Provisional application No. 60/245,048, filed on Nov. 1, 2000.

(51) Int. Cl.
  *G11B 5/60*    (2006.01)
  *G11B 15/64*   (2006.01)
  *G11B 17/32*   (2006.01)
  *G11B 21/20*   (2006.01)
(52) U.S. Cl. ................................. 360/234.6; 360/245.8
(58) Field of Classification Search ... 360/245.3–247.7
  See application file for complete search history.

(56) References Cited

U.S. PATENT DOCUMENTS

| 5,473,488 | A | * | 12/1995 | Gustafson et al. | 360/245.5 |
| 5,519,552 | A | * | 5/1996 | Kohira et al. | 360/244.3 |
| 5,856,896 | A | | 1/1999 | Berg et al. | 360/104 |
| 5,898,541 | A | | 4/1999 | Boutaghou et al. | 360/109 |
| 6,021,021 | A | * | 2/2000 | Alt et al. | 360/245.7 |
| 6,078,472 | A | * | 6/2000 | Mitoh et al. | 360/245.4 |
| 6,282,063 | B1 | * | 8/2001 | Coon | 360/245.3 |
| 6,549,374 | B1 | * | 4/2003 | Ikeda et al. | 360/245.3 |
| 6,552,877 | B1 | * | 4/2003 | Tokuyama et al. | 360/245.7 |

* cited by examiner

*Primary Examiner*—A. J. Heinz
(74) *Attorney, Agent, or Firm*—Kinney & Lange, P.A.

(57) ABSTRACT

An actuation assembly includes a movable actuator arm, a suspension assembly, a slider, and means for attaching the slider to the gimbal. The actuator arm supports the suspension assembly, which includes a gimbal carrying a gimbal bond pad that is electrically isolated from the gimbal. The slider includes an air bearing surface and a gimbal opposing face opposite the air bearing surface. The means for attaching the slider to the gimbal provide a direct contact between the gimbal and the slider and elevate a plane of the gimbal opposing face with respect to the gimbal bond pad. The means for attaching the slider to the gimbal is integral with the gimbal.

20 Claims, 6 Drawing Sheets

SUSPENSION DESIGN FOR ELEVATED SLIDER ATTACHMENT

CROSS-REFERENCE TO RELATED APPLICATION(S)

This application claims priority from Provisional Application No. 60/245,048, filed Nov. 1, 2000, for "SUSPENSION DESIGN AND METHOD FOR ATTACHING MAGNETIC RECORDING HEAD" by Michael L. Rancour, Richard L. Segar and Sandeepan Bhattacharya.

BACKGROUND OF THE INVENTION

The present invention relates to attaching a slider to a suspension assembly. More particularly it relates to a gimbal for supporting a slider that provides a direct contact between the gimbal and the slider.

Air bearing sliders have been extensively used in disc drives to appropriately position a transducing head above a rotating disc. The transducing head is typically carried by the slider. Conventionally, head positioning is accomplished by operating an actuator arm with a large-scale actuation motor, such as a voice coil motor (VCM), to radially position the slider on a gimbal at the end of the actuator arm. Typically, disc drive systems include a suspension assembly attached to the actuator arm for supporting and positioning the slider. The suspension assembly includes a load beam attached to the actuator arm and has a gimbal disposed on the other end of the load beam. The air bearing slider carrying the transducing head is mounted to the gimbal. This type of suspension is used with both magnetic and nonmagnetic discs. The VCM rotates the actuator arm and the suspension assembly to position the transducing head over a desired radial track of the disc.

In order for the VCM to correctly position the slider and transducing head over the desired track of the disc, the disc drive communicates with the slider electrically through conductive traces disposed along the suspension assembly. The traces extend along the gimbal and end at gimbal bond pads formed adjacent to the slider. The slider has bond pads disposed on a forward face such that a connection can be made between the traces and the slider.

Difficulties arose in prior art systems for attaching the slider to the gimbal, specifically with vertical alignment of the slider on the gimbal. In particular the slider bond pads should be precisely positioned proximate to the gimbal bond pads so that a connection can be made between the two. One prior art system uses laminated circuit material to provide vertical alignment of the flex circuit to the slider bond pads. Other systems use notches in the slider to allow alignment of the slider with the gimbal bond pads. Some systems use conductive adhesives to reduce the electrical resistance between the slider and the gimbal, but these adhesives did not reduce the area of contact between the gimbal and the slider. The use of conductive adhesives increases the cost and manufacturing time of assembling a slider to a gimbal, whereas the use of laminated circuit material and notches increases the cost of the final assembly and the manufacturing time for the components.

In prior art systems that do not use conductive adhesives, the thick adhesive bond line between the slider and the gimbal increases the electrical resistance between the transducing head and the suspension. The thick adhesive bond line and poor vertical alignment reduces conductivity between the gimbal and slider. Poor conductivity allows a charge to build on the slider, which results in poor electrical performance by increasing the noise in data read by the transducing head. When the layers between the gimbal and slider are large, poor static attitude adjustment results, and in particular poor static attitude control exists over the pitch and roll position of the slider.

A gimbal design is needed in the art for allowing a slider to be attached to a gimbal in a manner that reduces the area of contact between the gimbal and the slider, increases conductivity, improves static attitude control and is more efficient for manufacturing.

BRIEF SUMMARY OF THE INVENTION

The present invention relates to a disc drive having a recording disc rotatable about an axis, a slider supporting a transducing head for transducing data with the disc, and an actuation assembly supporting the slider to position the transducing head adjacent a selected radial track of the disc. The actuation assembly includes a movable actuator arm, a load supported by the actuator arm, and a gimbal. The gimbal is connected to a distal end of the load beam. The gimbal supports the slider and has a slider opposing face. At least one standoff extends from the slider opposing face toward the disc. The standoff provides a direct contact between the gimbal and the slider.

DETAILED DESCRIPTION

Figure 1:
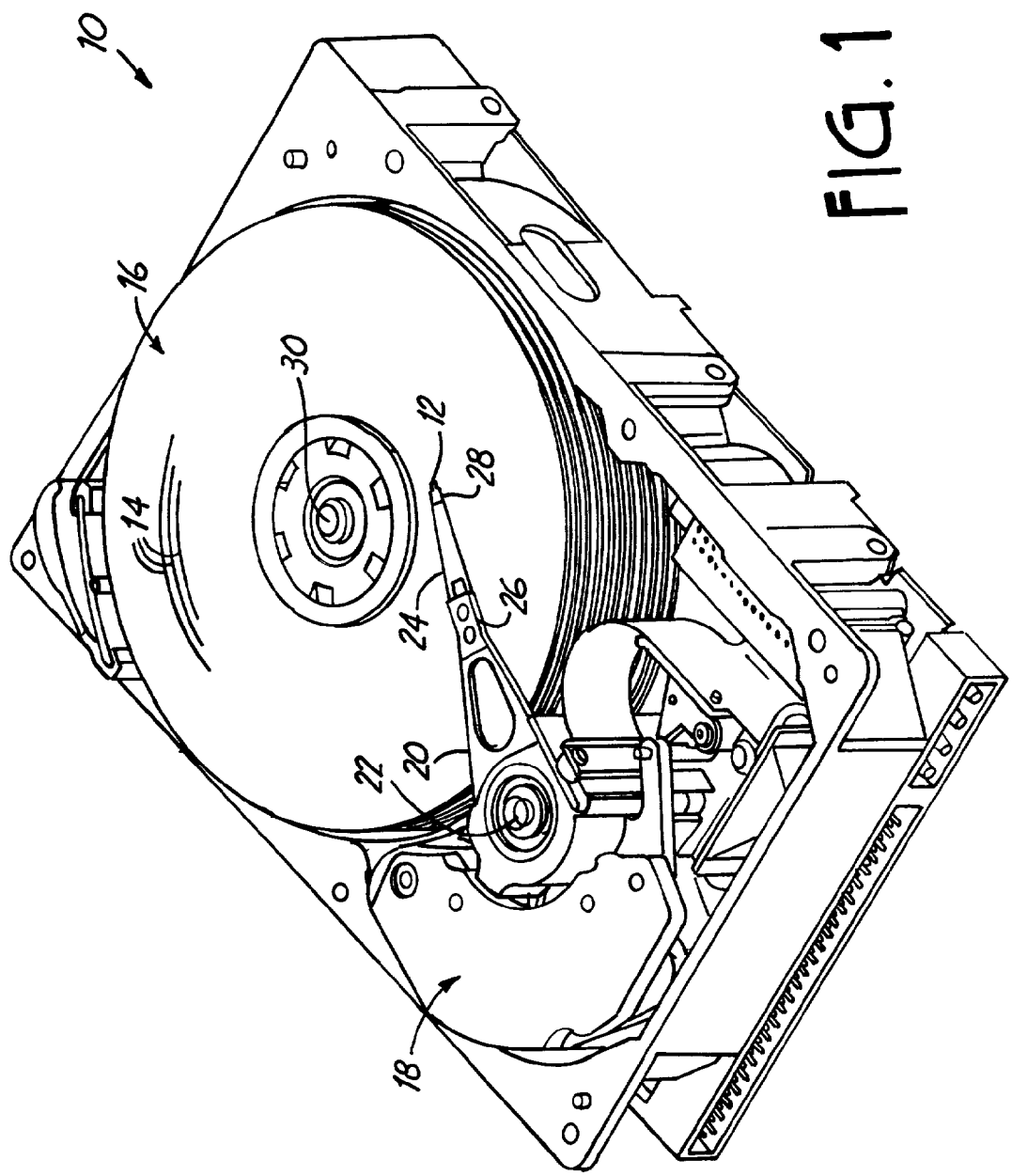
FIG. 1 shows a top perspective view of a disc drive actuation system for positioning a slider over tracks of a disc.

FIG. 1 is a perspective view of a disc drive 10 including an actuation system for positioning a slider 12 over a track 14 of a disc 16. Disc drive 10 includes a voice coil motor (VCM) 18 arranged to rotate an actuator arm 20 on a spindle around an axis 22. A load beam 24 is connected to actuator arm 20 at a head mounting block 26. A gimbal 28 is connected to an end of load beam 24 and slider 12 is attached to gimbal 28. Slider 12 carries a transducing head (not shown in FIG. 1) for reading and/or writing data on concentric tracks 14 of disc 16. Disc 16 rotates around an axis 30, so that windage is encountered by slider 12 to keep it aloft a small distance above the surface of disc 16.

Figure 2:
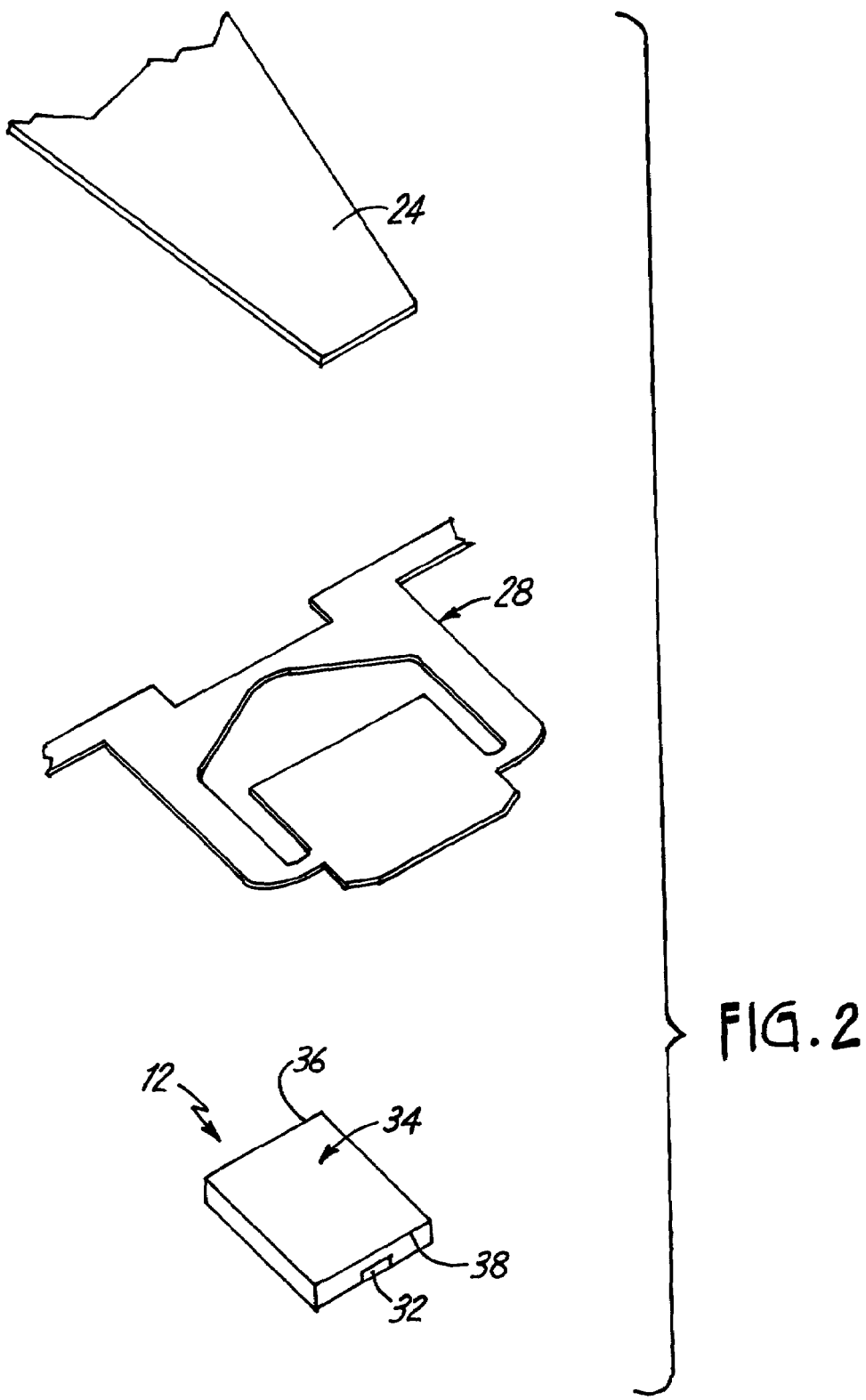
FIG. 2 shows an exploded perspective view of a distal portion of the disc drive actuation system of FIG. 1.

FIG. 2 is an exploded perspective view of a distal portion of disc drive 10 (shown in FIG. 1). Shown in FIG. 2, from top to bottom are load beam 24, gimbal 28 and slider 12 carrying a transducing head 32. Gimbal 28 is attached to load beam 24 and slider 12 attaches to a bottom surface of gimbal 28. Gimbal 28 provides a spring connection between slider 12 and load beam 24. Slider 12 includes a disc opposing face (not shown) and a gimbal opposing face 34 which is attached to a slider opposing face (not shown) on the bottom surface of gimbal 28. Slider 12 has a leading edge 36 and a trailing edge 38. Gimbal 28 is configured such that it allows slider 12 to move in pitch and roll directions to compensate for fluctuations in the spinning surface of disc 16. Transducing head 32 is located proximate to trailing edge 38 of slider 12. In operation, load beam 24 and gimbal 28 carrying slider 12 move together as coarse positioning is performed by VCM 18 (FIG. 1) to rotate actuator arm 20 (FIG. 1).

Figure 3:
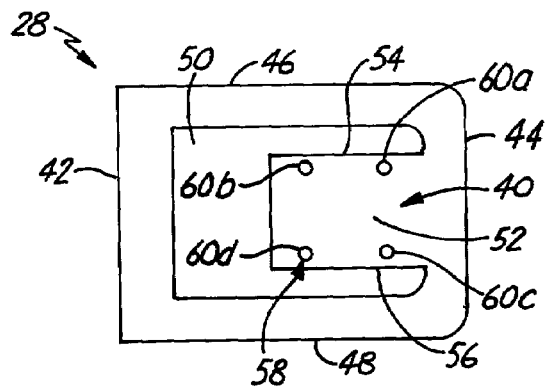
FIG. 3 is a bottom view of an embodiment of a gimbal of the present invention.

FIG. 3 is a bottom view of a first embodiment of gimbal 28 according to the present invention. Gimbal 28 has a slider opposing face 40 on its bottom surface. Slider opposing face 40 engages gimbal opposing face 34 of slider 12 (FIG. 2). Gimbal 28 has a front edge 42, a rear edge 44, a first side edge 46 and a second side edge 48. Front edge 42 of gimbal 28 is attached to load beam 24 (FIG. 2). An opening 50 extends through gimbal 28. Opening 50 is bounded by the four edges 42, 44, 46 and 48. Gimbal 28 has a tongue 52 lying in the same horizontal plane as gimbal 28. Tongue 52 extends from rear edge 44 into opening 50. Tongue 52 has a first side edge 54 and a second side edge 56. Tongue 52 is preferably substantially rectangular, although those skilled in the art will recognize tongue 52 may be other shapes, such as circular or triangular.

Standoffs 58 are formed on tongue 52 and extend from slider opposing face 40. Slider 12 (FIG. 2) is attached to standoffs 58 with adhesive in an exemplary embodiment. In the embodiment of gimbal 28 shown in FIG. 3, standoffs 58 are configured as four bumps 60. Each bump 60 is substantially circular, although the bumps could also take other forms, such as triangular or rectangular. Although the embodiment shown in FIG. 3 shows four bumps on tongue 52, those skilled in the art will recognize that there may be fewer or more bumps. Bumps 60 are located on tongue 52 with at least two bumps (60a and 60b) proximate and substantially parallel to first side edge 54 of gimbal 28. The other two bumps (60c and 60d) are proximate and substantially parallel to second side edge 56.

Figure 4:
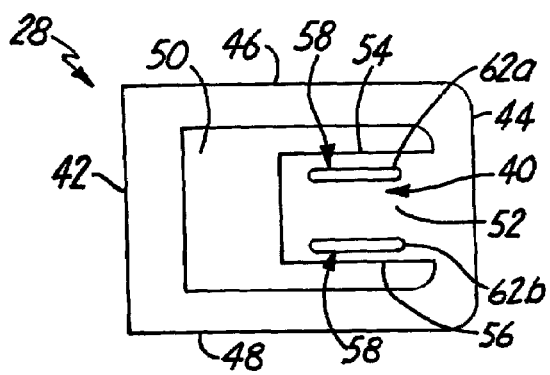
FIG. 4 is a bottom view of a second embodiment of a gimbal of the present invention.

FIG. 4 is a bottom view of a second embodiment of gimbal 28 according to the present invention. The structure of gimbal 28 is the same as the structure disclosed with respect to FIG. 3 (the first embodiment). Standoffs 58 of the second embodiment of gimbal 28 are configured as two rails 62. Preferably there is a first rail 62a and a second rail 62b formed on tongue 52. First rail 62a is substantially parallel and proximate to first side edge 54 of tongue 52. Second rail 62b is substantially parallel to and proximate to second side edge 56 of tongue 52. Those skilled in the art will recognize there may be fewer or more rails and that the rails may have alternate configurations on tongue 52, for example rails 62 may lie perpendicular to side edges 54 and 56.

Figure 5:
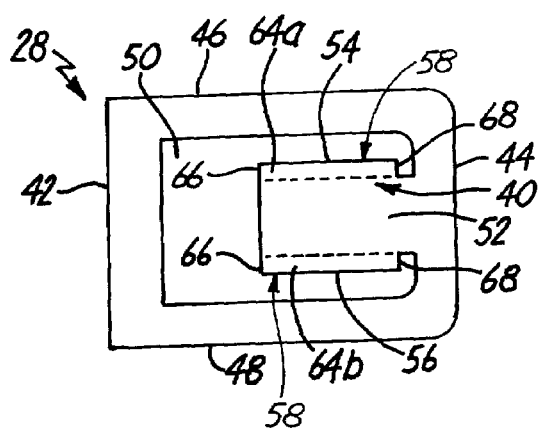
FIG. 5 is a bottom view of a third embodiment of a gimbal of the present invention.

FIG. 5 is a bottom view of a third embodiment of gimbal 28 according to the present invention. The structure of the third embodiment of gimbal 28 is substantially similar to the structure of the first embodiment of gimbal 28 shown in FIG. 3. However, standoffs 58 of the third embodiment are configured as wings 64. Wings 64 extend out of the horizontal plane of gimbal 28 toward disc 16 (FIG. 1). A first wing 64a is located proximate and substantially parallel to first side edge 54. A second wing 64b is located proximate and substantially parallel to second side edge 56. Wings 64 extend along a substantial portion of tongue 52 and have a distal end 66 adjacent to opening 50 and a proximal end 68 adjacent to rear edge 44.

Figure 6:
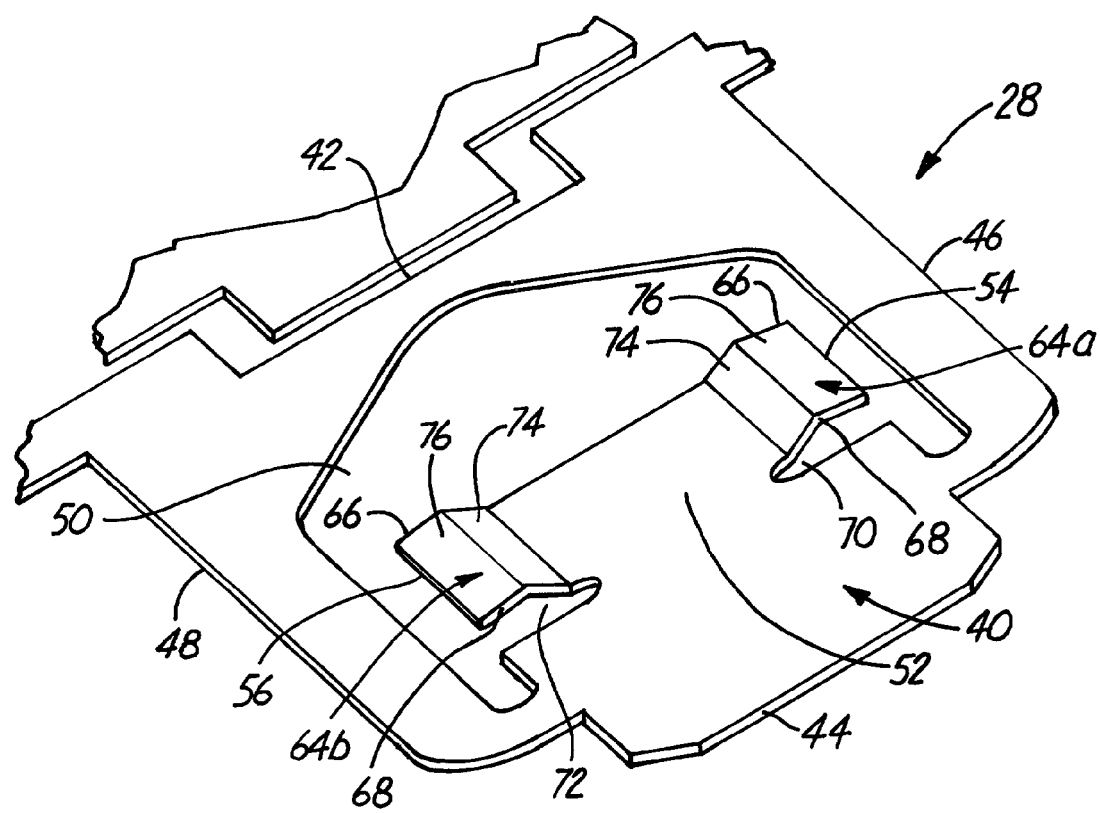
FIG. 6 is a bottom perspective view of the distal end portion of the disc drive actuation system showing the gimbal of FIG. 5.

FIG. 6 is a bottom perspective view of the distal end portion of a disc drive actuation system employing the present invention. The third embodiment of gimbal 28 is shown with wings 64. Wings 64 are portions of tongue 52 extending out of the horizontal plane of gimbal 28 toward disc 16 (FIG. 1). A first form line 70 and a second form line 72 are formed into tongue 52 thereby allowing portions of tongue 52 to be folded to form wings 64a and 64b. First form line 70 is located near proximal end 68 of tongue 52 and is substantially perpendicular to first side edge 54. Second form line 72 is located near proximal end 68 of tongue 52 and is substantially perpendicular to second side edge 56. Each wing 64a and 64b has two parts, a shoulder portion 74 and an arm portion 76. Shoulder portion 74 extends away from tongue 52 toward disc 16 (FIG. 1). Arm portion 76 lies substantially parallel to the horizontal plane of gimbal 28 between gimbal 28 and disc 16 (FIG. 1).

Figure 7:
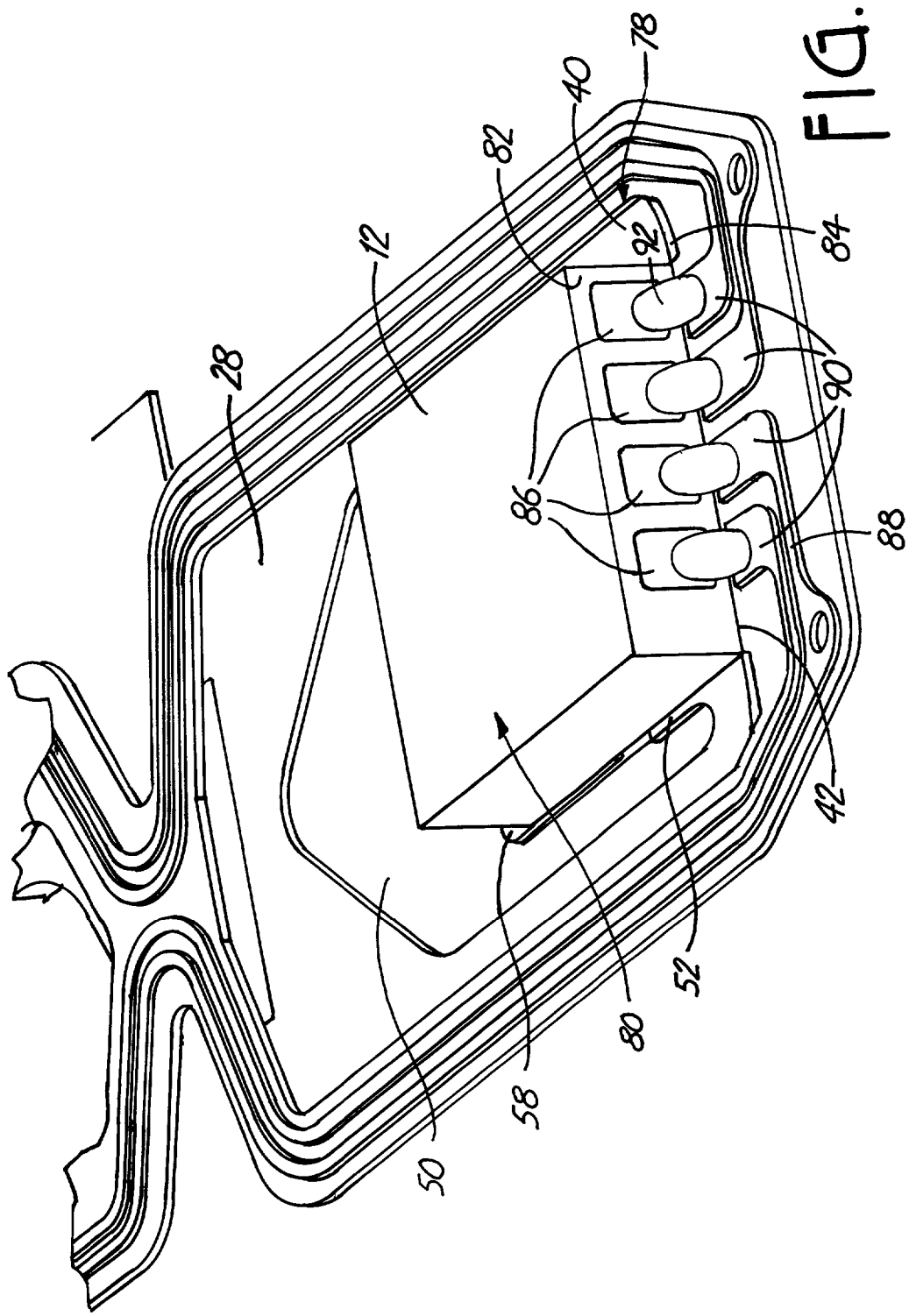
FIG. 7 is a bottom perspective view of the distal end portion of the disc drive actuation system with the slider attached.

FIG. 7 shows a bottom perspective view of the distal end portion of the disc drive actuation assembly with slider 12 attached to gimbal 28. A flex circuit material 78 is disposed on slider opposing face 40 of gimbal 28. In the preferred embodiment of gimbal 28, flex circuit material 78 is not disposed on tongue 52 and therefore no flex circuit material lies between slider 12 and standoffs 58 of gimbal 28. During operation, when slider 12 flies above the disc, gimbal 28 typically permits three primary degrees of movement for slider 12, which are vertical motion, pitch and roll rotation.

Slider 12 has a disc opposing face 80 and a gimbal opposing face 34 (FIG. 2). Gimbal opposing face 34 of slider 12 is attached to gimbal 28 on the standoffs 58 located on tongue 52. Slider 12 has a forward face 82 located proximate and substantially parallel to front edge 42 of gimbal 28. Slider bond pads 86 are located on forward face 82 of slider 12. Flex circuit material 78 is disposed upon gimbal 28 prior to attaching slider 12, and forms an edge 84 proximate to forward face 82 of slider 12. No flex circuit material 78 is located between slider 12 and gimbal 28 such that there is a direct contact between the slider and the gimbal. An adhesive (not shown) is used to bond slider 12 to tongue 52 of gimbal 28.

A trace layer 88 is formed upon flex circuit material 78 disposed on gimbal 28. Trace 88 completes a circuit connection between the electronic components of the disc drive (not shown) and slider 12. Trace 88 travels along the underside of actuator arm 20, load beam 24 and gimbal 28. Trace 88 is typically made of copper with gold plated on top of the copper layer. Each trace 88 ends at a gimbal bond pad 90. In an exemplary embodiment there is at least one gimbal bond pad 90 located on gimbal 28 for each slider bond pad 86. Gimbal bond pads 90 are located along edge 84 of gimbal 28. Typically, a gold bond ball 92 is disposed on each gimbal bond pad 90. Bond ball 92 is bonded to gimbal bond pad 90 and its respective slider bond pad 86. An electrical connection is made between slider 12 and trace 88 through the slider bond pads 86 and gimbal bond pads 90. Bond balls 92 act as an electrical conduit and complete the electrical connection between slider 12 and trace 88. Standoffs 58 provide a surface for placing slider 12 on gimbal 28 such that slider bond pads 86 and gimbal bond pads 90 are vertically aligned.

Figure 8:
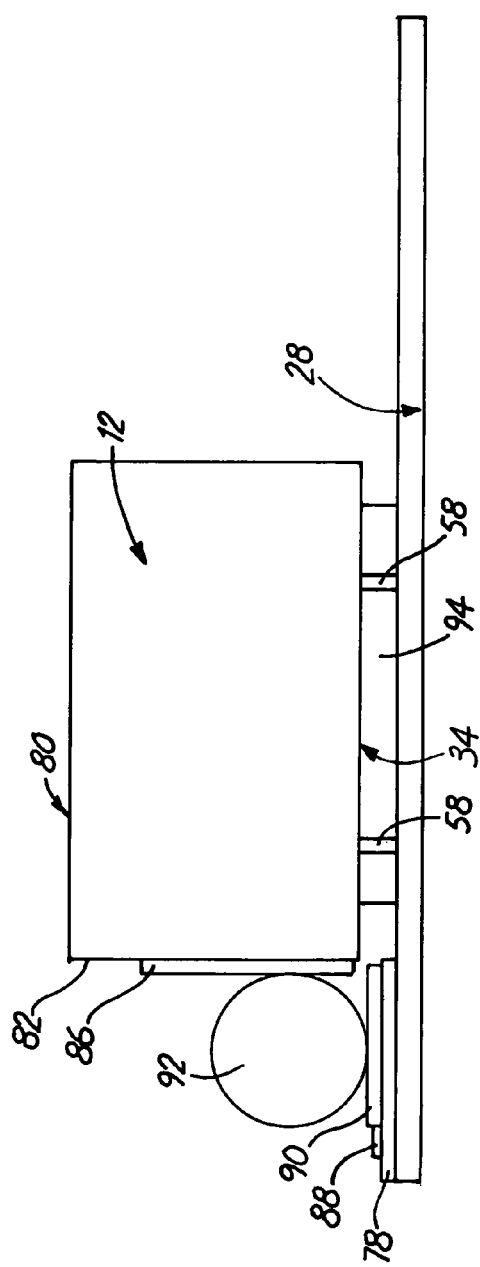
FIG. 8 is an upside-down cross-sectional view of the distal end portion of the disc drive actuation system.

FIG. 8 is an upside-down cross-sectional view of the distal end portion of the disc drive actuation system of FIG. 1. Slider 12 is attached to gimbal 28 such that disc opposing face 80 faces disc 16 (FIG. 1). Standoffs 58 extend from slider opposing face 40 of gimbal 28. Slider 12 is bonded to standoffs 58 with an adhesive 94. Flex circuit material 78 extends to forward face 82 of slider 12 but not between slider 12 and gimbal 28. Gimbal bond pad 90 lies on flex circuit material 78 along edge 84 of flex circuit material 78. Slider bond pad 86 is affixed to forward face 82 of slider 12. Gold bond ball 92 is bonded to slider bond pad 86 and gimbal bond pad 90 to provide an electrical connection between slider 12 and the electrical components of the disc drive connected to flex circuit material 78. Standoffs 58 raise slider 12 above gimbal surface 28 such that slider 12 does not interfere with or contact flex circuit material 78 or gimbal bond pad 90. In order for the electrical connection to slider 12 to work, slider 12 must be placed in a precise position on gimbal 28 such that gimbal bond pads 90 line up with their respective slider bond pad 86. Standoffs 58 allow slider 12 to be properly placed on gimbal 28 such that bond pads 86 and 90 line up with each other.

Figure 9:
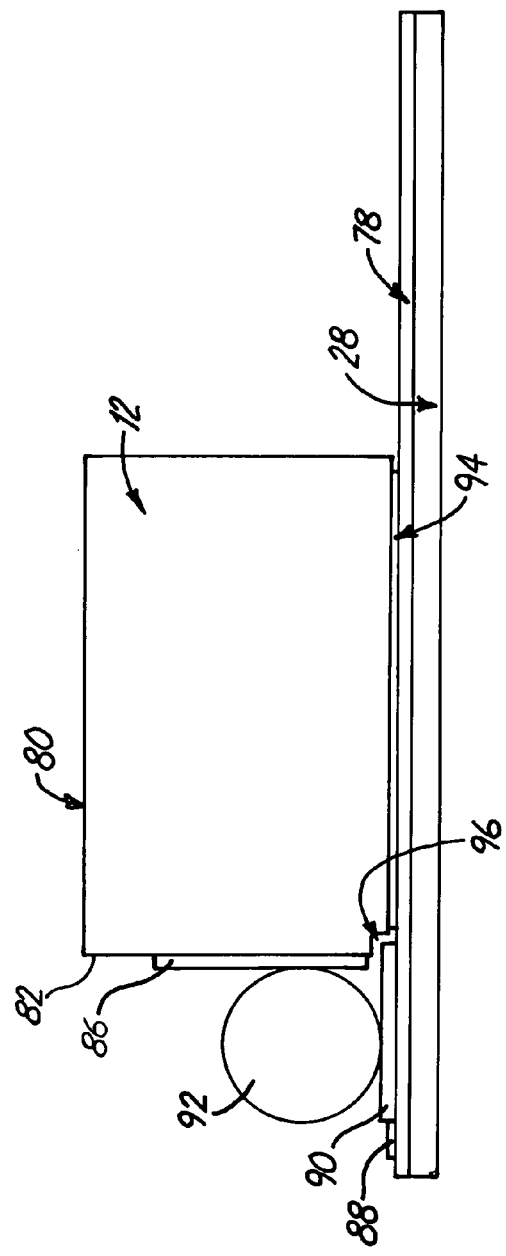
FIG. 9 is an upside-down cross-sectional view of the distal end portion of a prior art disc drive actuation system.

FIG. 9 is an upside-down cross-sectional view of the distal end portion of a prior art disc drive actuation system and is shown to illustrate an improvement of the present invention from the prior art systems. The prior art system includes the gimbal 28 having a slider opposing face 40. In the prior art system, flex circuit material 78 is layered upon the entire slider opposing face 40 of gimbal 28, including the area between gimbal 28 and slider 12. Trace 88 terminates at gimbal bond pad 90 located along front edge 42 of gimbal 28. Slider bond pad 86 is located on forward face 82 of slider 12. Gold bond ball 92 is bonded to slider bond pad 86 and gimbal bond pad 90 to provide an electrical connection between trace 88 and slider 12. Adhesive 94 is used to connect slider 12 to flex circuit material 78 on gimbal 28. Flex circuit material 78 and adhesive 94 do not have a combined height that raises slider 12 completely above gimbal bond pad 90. Therefore, to precisely position slider 12 upon gimbal 28 (including flex circuit material 78) such that each slider bond pad 86 lines up with its respective gimbal bond pad 90, a notch 96 is formed in slider 12. Notch 96 is formed on gimbal opposing face 34 of slider 12 adjacent to forward face 82 of slider 12. Notch 96 serves as a positioning reference to place slider 12 upon gimbal 28 such that slider bond pad 86 and gimbal bond pad 90 are aligned. The present invention (FIG. 8) does not require notch 96 in order to position slider 12 onto gimbal 28. The slider is positioned onto gimbal 28 with respect to standoffs 58.

In FIG. 9, slider 12 is located on top of flex circuit material 78 disposed on gimbal 28. Static attitude is the relationship between the plane of the disc opposing face of the slider to a reference point on load beam 24 (FIG. 2), typically where head mounting block 26 (FIG. 2) contacts load beam 24. Static attitude impacts fly height, take off velocity and the reliability of the head disc interface. The increased layers between slider 12 and gimbal 28 in the prior art system and the non-planar surface of flex circuit material 78 results in poor static attitude. The worse static attitude is, or the non-planarity of the surface slider 12 is attached to, the less control there is over the pitch and roll position of slider 12. Introducing more layers between gimbals 28 and slider 12 results in more variation in the static attitude, thereby there is less control over slider 12. Furthermore, if the slider cannot be attached to the gimbal with the required static attitude, a post assembly adjustment must be done to change the static attitude at an additional cost and with detrimental effects to other suspension characteristics.

Prior art disc actuation systems result in poor vertical alignment between slider bond pads 86 and gimbal bond pads 90. In addition, correcting the poor alignment requires post assembly adjustment that increases costs and takes additional time. The thick adhesive bond line and the poor vertical alignment reduces the conductivity between gimbal 28 and slider 12. Poor conductivity permits slider 12 to charge up and is associated with poor electrical performance by increasing the noise in the slider signal.

In the present invention, the standoffs reduce the area of contact between the gimbal and the slider, improves static control, increases conductivity, and is more efficient and less costly for manufacturing. The present invention removes the flex circuit material from the gimbal and adds formed features, or standoffs, to the gimbal. The standoffs provide a surface for placing the slider on the gimbal such that the slider bond pads and gimbal bond pads have improved vertical alignment. This differs from prior art systems by allowing vertical alignment of the slider to suspension bond pads to be achieved without the need for slider notches or flex circuit standoffs on the gimbal. The standoffs also provide a direct contact between the gimbal and the slider. Head suspension resistance is reduced by the intimate contact between the gimbal and the slider without a thick adhesive bond line in those areas. Improved vertical alignment and direct contact improved the conductivity between the gimbal and the slider, thereby resulting in better electrical performance of the slider and preventing the slider from charging up during operation.

The use of standoffs on the gimbal for attaching the slider reduces the layers between the gimbal and the slider. Reducing the layers between the gimbal and the slider improves the planarity of the surface the slider is attached to and thereby improves static attitude. Improved static attitude means more control over the pitch and roll position of the slider. Finally, by improving the static attitude of the slider and the vertical alignment between the gimbal and the slider eliminates the need for post assembly adjustment to the slider. Thus, manufacturing time and cost is reduced.

Although the present invention has been described with reference to preferred embodiments, workers skilled in the art will recognize that changes may be made in form and detail without departing from the spirit and scope of the invention.

What is claimed is:

1. An actuation assembly comprising:
   a movable actuator arm supporting a suspension assembly, the suspension assembly including a gimbal carrying a gimbal bond pad that is electrically isolated from the gimbal; and
   a slider including an air bearing surface and a gimbal opposing face opposite the air bearing surface; and
   means for attaching the slider to the gimbal so as to provide a direct contact between the gimbal and the slider, and to elevate a plane of the gimbal opposing face with respect to the gimbal bond pad, wherein the means for attaching the slider to the gimbal is integral with the gimbal.

2. The actuation assembly of claim 1, wherein the means for attaching the slider to the gimbal comprises a standoff formed on a slider opposing face of the gimbal.

3. The actuation assembly of claim 2, wherein the gimbal includes a front edge and a rear edge on the slider opposing face, an opening extending through the gimbal, and a tongue extending from the rear edge into the opening and towards the front edge, wherein the standoff is located on the tongue.

4. An actuation assembly comprising:
   a movable actuator arm;
   a load beam supported by the actuator arm;

a slider supporting a transducing head, the slider having an air bearing surface and a gimbal opposing face opposite the air bearing surface;

a gimbal supporting the slider and having a slider opposing face and carrying a gimbal bond pad that is electrically isolated from the gimbal, the gimbal connected to a distal end of the load beam; and at least two standoffs extending from the slider opposing face, wherein the standoffs are integrally formed from the gimbal to provide a direct contact between the gimbal and the slider, the standoffs having a height greater than a height of the gimbal bond pad so that the gimbal opposing face of the slider is vertically spaced from a surface of the gimbal bond pad.

5. The actuation assembly of claim 4, wherein the standoff comprises a wing.

6. The actuation assembly of claim 4, wherein the gimbal includes a front edge and a rear edge on the slider opposing face, an opening extending through the gimbal, and a tongue extending from the rear edge into the opening and towards the front edge.

7. The actuation assembly of claim 6, wherein the standoff is located on the tongue.

8. The actuation assembly of claim 4, wherein the slider is mounted to the gimbal with an adhesive.

9. The actuation assembly of claim 4, wherein the actuation assembly further comprises:

a flex circuit material disposed on the slider opposing face of the gimbal wherein a portion of the slider opposing face supporting the slider directly contacts the slider.

10. The actuation assembly of claim 9, wherein the flex circuit material is polyimide.

11. The actuation assembly of claim 4, wherein the standoff comprises a bump.

12. The actuation assembly of claim 4, wherein the standoff comprises a rail.

13. A head gimbal assembly comprising:

a slider having an air bearing surface and a gimbal opposing face opposite the air bearing surface;

a gimbal for supporting the slider, the gimbal having a slider opposing face and carrying a gimbal bond pad that is electrically isolated from the gimbal; and at least two standoffs integrally formed on the slider opposing face wherein the standoffs provide a direct contact between the gimbal and the slider and the standoffs elevate plane of the gimbal opposing face with respect to the gimbal bond pad.

14. The head gimbal assembly of claim 13, wherein the gimbal includes a tongue and a frame, and wherein the tongue is connected to a rear edge of the frame and the standoff is on the tongue to support the slider.

15. The head gimbal assembly of claim 14, further comprising an electrical connector between the gimbal and the slider, wherein the electrical connector is positioned on the frame.

16. The head gimbal assembly of claim 13, wherein the standoff comprises a rail.

17. The head gimbal assembly of claim 13, wherein the standoff comprises a bump.

18. The head gimbal assembly of claim 13, wherein the standoff comprises a wing.

19. The head gimbal assembly of claim 13, wherein the gimbal includes a front edge and a rear edge on the slider opposing face, an opening extending through the gimbal, and a tongue extending from the rear edge into the opening and towards the front edge.

20. The head gimbal assembly of claim 19, wherein the standoff is located on the tongue.

* * * * *